W. F. FREIDAG.
MANUAL CONTROL FOR THE FUEL SUPPLY OF INTERNAL COMBUSTION ENGINES.
APPLICATION FILED NOV. 15, 1912.
1,113,768.
Patented Oct. 13, 1914.
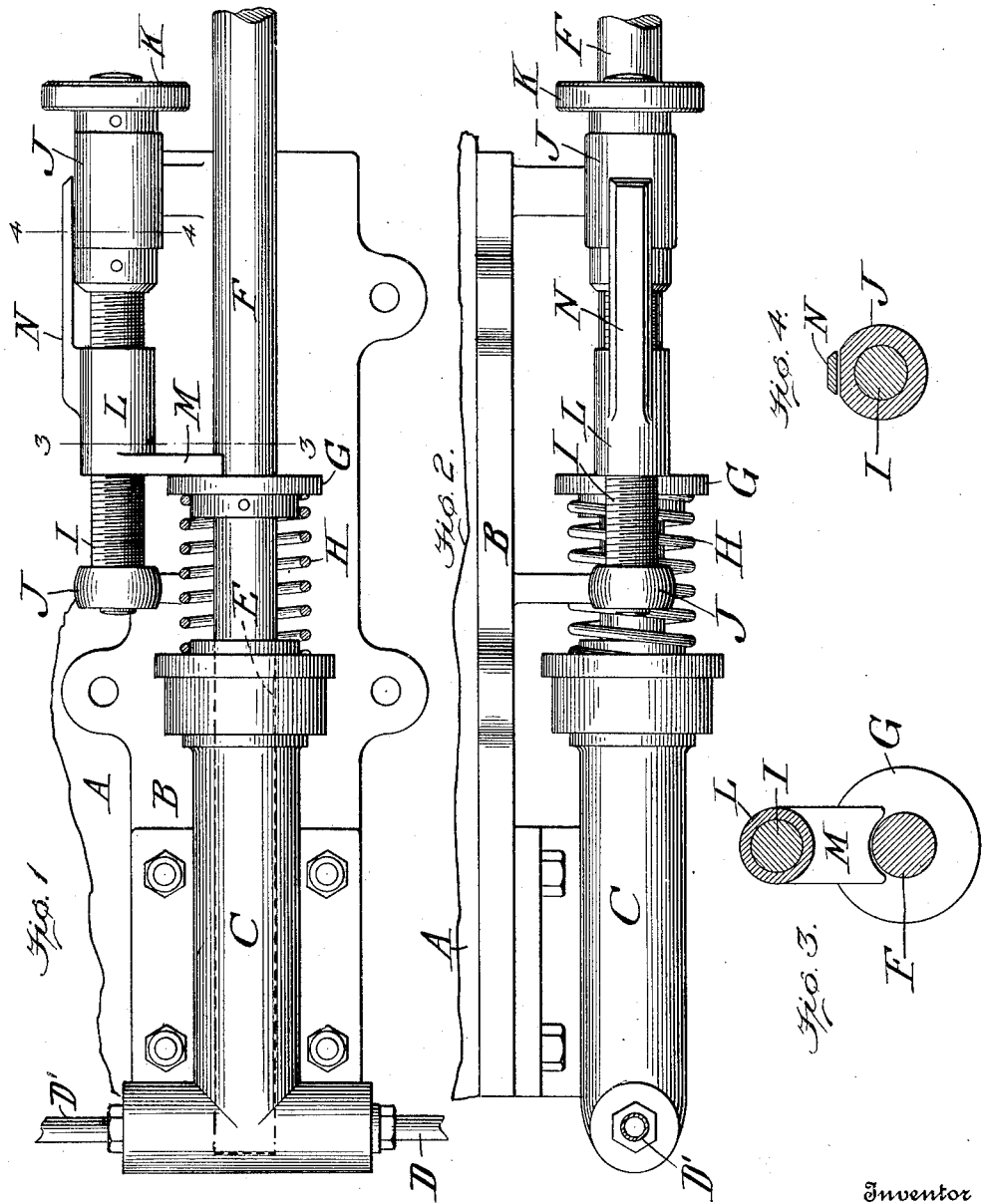
Witnesses
Edwin L. Bradford
Robert Craig Greene.
Inventor
William F. Freidag
By Wallace Greene,
Attorney

UNITED STATES PATENT OFFICE.

WILLIAM F. FREIDAG, OF FREEPORT, ILLINOIS, ASSIGNOR TO STOVER ENGINE WORKS, OF FREEPORT, ILLINOIS, A CORPORATION OF ILLINOIS.

MANUAL CONTROL FOR THE FUEL-SUPPLY OF INTERNAL-COMBUSTION ENGINES.

1,113,768.  Specification of Letters Patent.   Patented Oct. 13, 1914.

Application filed November 15, 1812.   Serial No. 731,524.

*To all whom it may concern:*

Be it known that I, WILLIAM F. FREIDAG, a citizen of the United States, residing at Freeport, in the county of Stephenson and State of Illinois, have invented certain new and useful Improvements in Manual Control for the Fuel-Supply of Internal-Combustion Engines, of which the following is a specification, reference being had therein to the accompanying drawing.

This invention relates to manual control for the fuel supply of internal combustion engines, although use of the novel devices is not limited to such engines. Its principal object is to provide simple devices whereby the fuel may be varied readily in any degree, from the slightest to a certain maximum, while the engine is in operation, and the desired end is attained by arranging a screw to vary the effective stroke of a fuel pump.

In the accompanying drawings, Figure 1 is a side elevation of a portion of a horizontal engine provided with my devices. Fig. 2 is a plan view of the same structure. Fig. 3 is a section on the line 3—3, Fig. 1. Fig. 4 is a section on the line 4—4, Fig. 1.

In these figures, A represents an engine cylinder and B a vertical pump-supporting plate detachably secured to the side thereof. This plate carries a small pump cylinder C having an inlet pipe D and a discharge pipe D' and provided with suitable valves. In this cylinder works a simple plunger E having a rod F sliding in suitable ways on the plate B and forced forward, by devices without novelty, at intervals corresponding with the movements of the engine. The plunger rod bears a fixed collar G between which and the end of the pump cylinder is a spring H which is compressed by said collar as the plunger advances and which by its resiliency moves the parts in a reverse direction as soon as the plunger-advancing devices permit.

A rod I, parallel to the plunger rod, and having its central portion threaded, is mounted to rotate, without longitudinal advance, in bearings J on the plate B, and is provided with a milled head K for its convenient manual rotation. On the threaded portion of this screw works a traveling nut L having an arm or stop M which projects into the line of the path of the collar G and which, when in certain positions, with respect to the screw, limits the rearward movement of the collar. The nut is provided with an extension N which at all times lies in contact with the flat surface of one of the screw's bearings and prevents the nut from rotating with the screw. Obviously rotation of the screw varies the position of the arm M, and may be such as to cause the arm to arrest the rearward movement of the collar at any desired point, and thus to vary the effective volume of the pump cylinder. It is also evident that the screw I may be rotated while the engine is operating, and to any degree, from the smallest fraction of a turn to any number of turns, correspondingly varying the amount of fuel drawn into the cylinder and delivered to the engine.

What I claim is:

1. The combination with an engine cylinder, of a plate detachably secured thereto and bearing pump mechanism comprising a reciprocating pump having a collar fixed to the plunger rod, a spring coiled about the rod between the pump and collar, to cause the return stroke of the plunger, a screw manually revoluble in bearings without advance, and a non-revoluble nut traveling along the screw and having an arm projecting into the path of said collar.

2. The combination with an internal combustion engine cylinder, of a plate detachably fixed upon the cylinder, a pump fixed to said plate and having an engine-reciprocated plunger bearing a collar at some distance from the pump barrel, a spring interposed between said barrel and stop and urging the plunger outward, a threaded shaft mounted on said plate alongside the plunger rod to rotate without advance and provided with a nut to engage the stop of the plunger and limit its outward movement, and an arm projecting from said nut and in sliding engagement with a fixed rectilineal portion of the structure, whereby all rotation of the nut is prevented whatever its position.

In testimony whereof I affix my signature in presence of two witnesses.

WILLIAM F. FREIDAG.

Witnesses:
H. H. ANTRIM,
O. W. DORMAN.